UNITED STATES PATENT OFFICE.

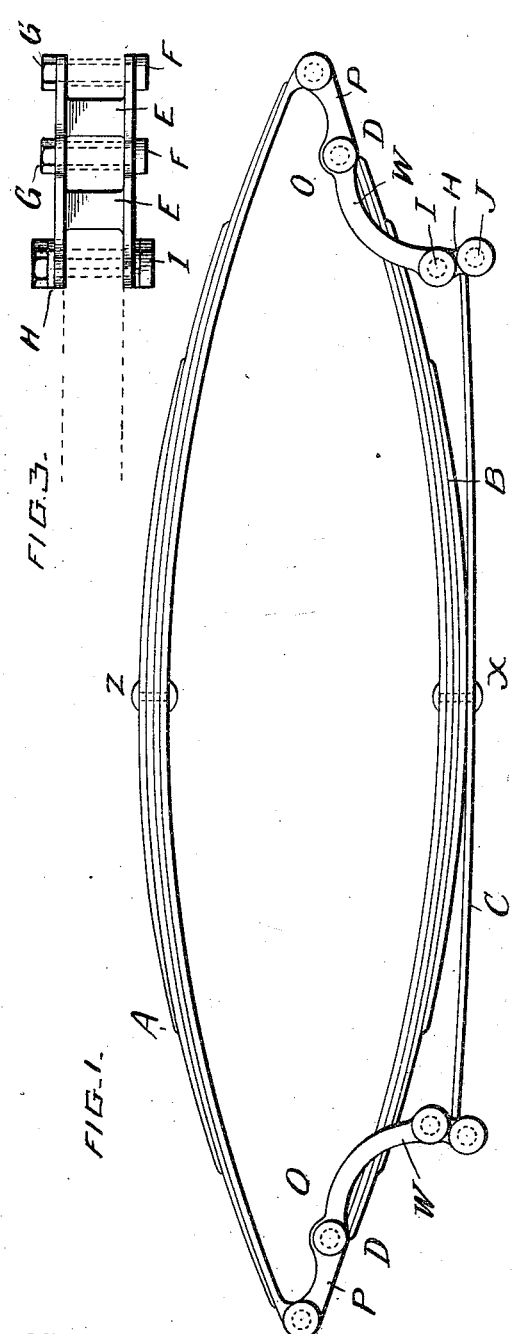
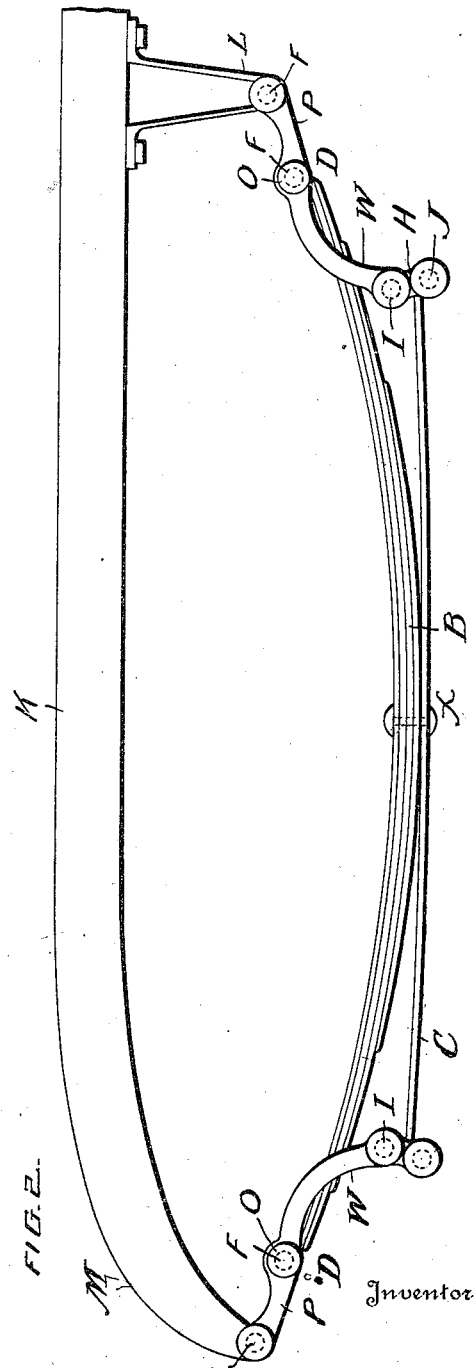

FRANK E. WILCOX, OF MECHANICSBURG, PENNSYLVANIA.

SPRING.

1,164,969.  Specification of Letters Patent.  Patented Dec. 21, 1915.

Application filed August 22, 1913. Serial No. 786,112.

*To all whom it may concern:*

Be it known that I, FRANK E. WILCOX, a citizen of the United States, residing at Mechanicsburg, in the county of Cumberland and State of Pennsylvania, have invented certain new and useful Improvements in Springs, of which the following is a specification.

The main object of the invention is the provision of spring means especially adapted for use in supporting the bodies of automobiles and other vehicles whereby the weight of the body initially will be supported by a spring, preferably a flexible leaf or leaves of low capacity, insuring an easy motion at relatively low speeds, and when the body moves upwardly and downwardly through a greater distance, which action accompanies relatively high speeds or the passage over rough roads or obstructions, the additional kinetic energy will be transmitted to a spring or springs of much higher capacity. However, parts of the entire spring means may be used to support a body directly under all conditions of service, and when the above recited mode of operation is not the essential end to be attained.

The invention consists in certain novelties of construction and combinations of parts herein set forth and claimed.

The accompanying drawing illustrates two examples only of the embodiment of the invention constructed according to the best modes of procedure I have so far devised for attaining the main purpose, but, as before stated, parts of the spring means shown may be used for the entire support of the body.

Figure 1 is a view in elevation of spring means comprising two main semi-elliptical springs of relatively high capacity and a supplemental spring of relatively low capacity. Fig. 2 is a view in elevation of spring means comprising a semi-elliptical spring and a supplemental leaf spring of less capacity than the semi-elliptical spring, combined with part of the frame of an automobile. Fig. 3 is a plan view of one of the levers to which the several springs are pivoted.

Referring to Fig. 1, the letters A and B designate the two semi-elliptical springs of relatively high capacity, the spring B in this instance being shorter than the spring A, as shown; C, the supplemental spring of relatively low capacity, in this instance located below the spring B and of less normal curvature; and D D are the levers to which the ends of the springs are pivoted.

As shown by Fig. 3, each lever is in one piece preferably forged to shape. It consists of two perforated side bars united by intermediate connecting cross pieces E E. The springs A and B have eyes at the ends and are pivoted to the levers by bolts F with nuts G on the ends. A link H is pivoted to the end of each lever by bolts I I and the supplemental spring C with eyes is pivoted to the links by bolts J J with nuts upon the ends of the bolts. The links allow the ends of the spring C to flex so that the surface of the spring can be brought into frictional contact with the surface of the spring B when sufficient power is applied to spring A.

The combination in Fig. 2 differs from that in Fig. 1 in substituting for the spring A the side piece K of the under frame of an automobile. A bracket L is secured to the side piece K, to which one end of one lever is pivoted, the other lever being pivoted to the end M of the side piece, as shown. The levers, lower main spring, supplemental spring links and bolts are designated by the same letters as used in Fig. 1. In both examples P is the power arm and W the weight arm of the lever, and O the fulcrum which is located at the ends of spring B, and as the spring can bend slightly the fulcrum is movable to a degree. The springs B and C are secured to an axle or other support at X and the power is transmitted or applied to the center of spring A at Z. In Fig. 2 the power is applied to the arms P P of the levers by the side piece. The weight arms W W straddle the ends of the spring B. The levers are of the first-class, but should the spring means be reversed and the power be applied to springs B B the levers would be of the third class. However, the mode of operation would be substantially the same in both cases, as is obvious, and the spring means in practice may be used in either position. As before stated, parts of the device, for example, the levers and the supplemental spring C, may be used in connection with substitutes for the spring A and side piece K, in which case the spring C may be of increased capacity or comprised of several leaves.

The mode of operation is as follows: When the vehicle is moving at a relatively slow speed the spring C carries the body yieldingly, but when it is moving at a high speed or is passing over a rough road, or when obstructions are encountered, the levers turn about their fulcrums until the spring C is flexed and brought into frictional contact with the spring B, then the additional kinetic energy is transmitted to the springs A and B in the first example and to the spring B in the second example.

What I claim is:

1. The combination of a curved leaf spring, a lever pivoted intermediate its ends to the free end of the spring, a supplemental leaf spring located at the convex surface of said curved leaf spring and its free end pivoted to one end of the lever, and means pivoted to the opposite end of the lever adapted to transmit to said lever end the weight of a vehicle body.

2. The combination of a curved leaf spring, a lever with a link pivoted intermediate its ends to the free end of the spring, a supplemental leaf spring located at the convex surface of said curved leaf spring and its free end pivoted to the link at one end of the lever, and means pivoted to the opposite end of the lever and adapted to coöperate with said lever in flexing the supplemental leaf spring.

3. The combination of a semi-elliptic spring, levers pivoted intermediate their ends to opposite ends of the semi-elliptic spring, a supplemental spring located at the convex surface of the semi-elliptic spring and pivoted to adjacent ends of the levers, and means located at the concave surface of said semi-elliptic spring and of greater length than said spring pivoted to the opposite ends of the levers.

4. The combination of a semi-elliptic spring; levers, each provided with a link, pivoted intermediate their ends to the ends of the semi-elliptic spring; a leaf spring located at the convex surface of the semi-elliptic spring and its opposite ends pivoted to the links at the ends of the levers; and means opposite the concave surface of the semi-elliptic spring pivoted to the opposite ends of the levers.

5. The combination of a semi-elliptic spring, levers with links pivoted intermediate their ends to the ends of the semi-elliptic spring, a supplemental leaf spring located at the convex surface of the semi-elliptic spring and pivoted to said links at adjacent ends of the levers, and a semi-elliptic spring pivoted at its opposite ends to the opposite ends of the levers.

6. The combination of a semi-elliptic spring, levers pivoted intermediate their ends to the ends of the semi-elliptic spring, a supplemental leaf spring located at the convex surface of the semi-elliptic spring and pivoted to adjacent ends of the levers, and a semi-elliptic spring pivoted at its opposite ends to the opposite ends of the levers.

7. The combination of a semi-elliptic spring, levers pivoted intermediate their ends to the ends of the semi-elliptic spring and straddling the ends of the same, a supplemental leaf spring pivoted to the adjacent ends of the levers, and a semi-elliptic spring pivoted at its opposite ends to the opposite ends of the levers.

8. The combination of two curved leaf springs with their concave surfaces facing each other, a leaf spring located at the convex surface of one of the springs, and a lever pivoted at its extreme ends to the ends of the two outer springs, and pivoted intermediate its ends to the end of the middle or intermediate spring.

9. The combination of a supplemental leaf spring, a main leaf spring of greater capacity than the supplemental spring, two levers each having three pivotal points, the extreme end of each lever being in pivotal connection with the supplemental spring, and the main leaf spring pivoted to each lever intermediate the ends of each lever; the opposite ends of the levers being adapted to take the load and bend the ends of the supplemental leaf spring into contact with the main leaf spring.

10. The combination of a main leaf spring, a lever pivoted intermediate its ends to the end of the leaf spring. a supplemental leaf spring of less capacity than the main leaf spring located at the back of the said spring and pivoted to one end of the lever, and a member supporting part of the load pivoted to the other end of the lever, whereby the supplemental spring can be flexed into contact with the said main spring under excessive loads.

In testimony whereof I affix my signature in presence of two witnesses.

FRANK E. WILCOX.

Witnesses:
 B. V. ZIEGLER,
 J. E. HOERNER.